United States Patent
Plött (10) Patent No.: US 9,817,418 B2
(45) Date of Patent: Nov. 14, 2017

(54) POWER SUPPLY SYSTEM COMPRISING A PREPROCESSING DEVICE

(75) Inventor: Norbert Plött, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 324 days.

(21) Appl. No.: 14/411,211

(22) PCT Filed: Jun. 26, 2012

(86) PCT No.: PCT/EP2012/062283
§ 371 (c)(1),
(2), (4) Date: Dec. 24, 2014

(87) PCT Pub. No.: WO2014/000767
PCT Pub. Date: Jan. 3, 2014

(65) Prior Publication Data
US 2016/0004268 A1    Jan. 7, 2016

(51) Int. Cl.
*G05F 1/66* (2006.01)
*H02J 4/00* (2006.01)
(Continued)

(52) U.S. Cl.
CPC .............. *G05F 1/66* (2013.01); *H02J 3/38* (2013.01); *H02J 4/00* (2013.01); *H02J 3/46* (2013.01);
(Continued)

(58) Field of Classification Search
CPC .. H02J 3/46; H02J 2003/001; H02J 2003/003; H02J 2003/007
See application file for complete search history.

(56) References Cited

U.S. PATENT DOCUMENTS

| 8,417,391 B1* | 4/2013 | Rombouts | G05B 13/02 700/286 |
| 2007/0213878 A1* | 9/2007 | Chen | H02J 3/00 700/291 |

(Continued)

OTHER PUBLICATIONS

WO 2011032579 A1, Litzinger, Andreas, Mar. 2011 and translation.*

(Continued)

*Primary Examiner* — Jared Fureman
*Assistant Examiner* — Joel Barnett
(74) *Attorney, Agent, or Firm* — Laurence Greenberg; Werner Stemer; Ralph Locher (57) ABSTRACT

A power supply system contains a plurality of power generating devices, a plurality of power consuming devices, and a controller. The controller controls the power supply system based on a rated consumption value indicating an anticipated power consumption of the power supply system and also based on a standby value indicating a standby power. The standby value indicates the standby power made available by the power supply system at which emergency measures can be avoided if the actual power consumption deviates from the rated consumption. The power supply system further has a preprocessing device for calculating a rated consumption value and a standby value at which an emergency measure-free operation can be attained with the required probability, based on consumption values recorded in the past and using a probability value defined on the user side which defines the probability of the emergency measure-free operation of the power supply system.

15 Claims, 9 Drawing Sheets

(51) Int. Cl.
*H02J 3/38* (2006.01)
*H02J 3/46* (2006.01)
*H02J 3/00* (2006.01)

(52) U.S. Cl.
CPC ... *H02J 2003/001* (2013.01); *H02J 2003/003* (2013.01); *H02J 2003/007* (2013.01); *Y02E 60/76* (2013.01); *Y04S 10/54* (2013.01); *Y04S 20/224* (2013.01); *Y04S 40/22* (2013.01)

(56) References Cited

U.S. PATENT DOCUMENTS

2012/0245744 A1* 9/2012 Prosser ............... H02J 3/46
700/286
2013/0345888 A1* 12/2013 Forbes, Jr. ............ H02J 3/14
700/291

OTHER PUBLICATIONS

Anstine L. T. et al; "Application of Probability Methods to the Determination of Spinning Reserve Requirements of the Pennsylvania-New-Jersey-Maryland Interconnection"; IEEE Transactions on Power Apparatus and Systems, IEEE Inc. New York; vol. 82; No. 68; pp. 726-735; 1963; US; Oct. 1, 1963 ISSN: 0018-9510; DOI: 10.1109/TPAS.1963.291390; XP011159299.

Miguel A. Ortega-Vazquez et al; "Estimating the Spinning Reserve Requirements in Systems With Significant Wind Power Generation Penetration"; IEEE Transactions on Power Systems, IEEE Service Center, Piscataway, NJ; vol. 21; No. 1; pp. 114-124; 2009; US; Feb. 1, 2009; ISSN: 0885-8950; XP011238484.

Macpherson S. D. et al; "Modeling Stochastic Contingency Reserve Activation"; Innovative Technologies for an Efficient and Reliable Electricity supply (Citres), 2010 IEEE Conference on, IEEE, Piscataway, NJ; pp. 407-414; 2010; US; Jan. 1, 2010 ISBN: 978-1-4244-6076-2; DOI: 10.1109/CITRES.2010.5619769; XP009162092.

* cited by examiner

FIG 2

POWER SUPPLY SYSTEM COMPRISING A PREPROCESSING DEVICE

BACKGROUND OF THE INVENTION

Field of the Invention

The invention relates to a power supply system comprising a plurality of power generating devices and a plurality of power consuming devices as well as a controller with the capability to control the power supply system.

In a power supply system for providing electrical energy it is essential to ensure a balance is maintained at all times between fed-in and extracted electrical power. Load fluctuations must be compensated for within seconds of their occurrence so that the system or network frequency of the power supply system or, as the case may be, the power distribution network of the power supply system remains within predefined narrow limits.

To ensure that such a balance can be achieved, power generating devices or generators typically running in synchronism with the system frequency are not utilized up to their full rated capacity, but instead a certain regulating reserve is held available as a standby. In other words the control of the power supply system by means of the controller is realized as it were on the basis of a rated consumption value which specifies the anticipated power consumption of the power supply system as well as on the basis of at least one standby value specifying the regulating reserve or standby power, where the standby value specifies the standby power that is to be provided by the power supply system in order to enable emergency measures, for example in the form of forced shutdowns, connection of supplementary power from external networks, etc., to be avoided if the actual power consumption deviates from the rated consumption.

In today's power supply systems, the standby value or regulating reserve is usually estimated or calculated by specially trained operating personnel and input manually into the controller. The same applies to the regulating reserve or standby value, which must likewise be determined and input by the trained operating personnel.

BRIEF SUMMARY OF THE INVENTION

The object underlying the invention is to disclose a power supply system which can be more easily managed and makes the deployment of trained operating personnel necessary to a lesser extent than in the case of known prior art power supply systems.

This object is achieved according to the invention by means of a power supply system having the features recited in the main claim. Advantageous embodiments of the power supply system according to the invention are disclosed in dependent claims.

According thereto it is inventively provided that the power supply system comprises a preprocessing device which is suitable to calculate, on the basis of recorded historical consumption values and on the basis of a probability value predefined on the user side which specifies the probability of an emergency-measure-free operation of the power supply system, the rated consumption value and the at least one standby value by means of which the emergency-measure-free operation can be achieved with the predefined probability.

A significant advantage of the power supply system according to the invention is that with said system neither the rated consumption value nor the standby value must be determined manually by trained operating personnel, because the corresponding values are calculated automatically or independently by the preprocessing device. In order to enable the rated consumption value and the standby value to be determined in such a manner, the preprocessing device simply needs to be provided with historical consumption values and a probability value predefined on the user side which specifies the probability of operation of the power supply system free of emergency measures. In other words, on account of the preprocessing device provided according to the invention the power supply system is capable of controlling itself fully automatically if a probability value is specified once for the operation of the system, which probability value defines the mode of operation or, as the case may be, the acceptance of risks of failure.

Another significant advantage of the power supply system according to the invention is that the preprocessing device is able to adjust the rated consumption value and the standby value if the historical consumption values indicate a changing trend. Even in the event of changes in the number of power generating devices or power consuming devices or a change in the power generation or consumption behavior of the existing devices there is therefore no necessity for operator intervention, since a change in the generation behavior or consumption behavior can be detected through the evaluation of the historical values and taken into account for updating the rated consumption value and the standby value. In this case the probability value predefined on the user side, which describes the tolerated risk of failure of the power supply system, is included, so that apart from the respective absolute values of the rated consumption value and the standby value nothing changes with regard to the risk of emergency measures. A manual intervention is normally superfluous.

The probability value predefined on the user side can be input into the preprocessing device in numerical form, for example as a numeric value in the form 10%, 20%, etc. Alternatively it is possible to input the probability value in the form of a verbal formulation as a reliability target (e.g. intensive use of renewable energy sources, maximally reliable power supply). In such an embodiment it is simply necessary to store in a database the numeric probability value which correlates with the verbally formulated reliability target, so that an automatic or independent conversion into a numeric probability value can be carried out on the part of the preprocessing device.

In the preprocessing device it can be provided for example that the standby value and the rated consumption value are calculated for the first time during the operation of the power supply system when, following input of the first consumption values of the power supply system, "historical consumption values" are available, on the basis of which it is possible to perform an evaluation with reference to the probability value predefined on the user side and consequently to determine rated consumption value and regulating standby power. Prior to a first-time calculation it is possible to work with predefined default values which will be updated by means of the "historical consumption values".

The standby value and the rated consumption value can be determined particularly easily, and therefore advantageously, on the basis of a statistical evaluation; accordingly it is regarded as advantageous if the preprocessing device is embodied in such a way that it uses the recorded historical consumption values to calculate the statistical distribution of the consumption values and on the basis of the statistical distribution determines which minimum consumption value and which maximum consumption value could occur for the predefined probability value, and on the basis of the minimum and maximum consumption value determines the at least one standby value.

Preferably a single standby value is determined which is called upon both in the event that the actual power consumption exceeds the rated consumption and in the event that the actual power consumption falls below the rated consumption. Such an embodiment will be of advantage in particular when the power consumption values are normally distributed, in particular standard normally distributed.

In the event of other distributions, in particular asymmetric distributions around the power consumption mean value, it is regarded as advantageous if two standby values are determined, specifically a first standby value in the event that the actual power consumption exceeds the rated consumption, and a second standby value in the event that the actual power consumption falls below the rated consumption.

The rated consumption value and the standby value or values can be determined in a particularly simple manner if the preprocessing device is embodied in such a way that it calculates the rated consumption value by determining the average from the recorded historical consumption values, a first standby value by forming the difference between the rated consumption value and the maximum consumption value, and a second standby value by forming the difference between the rated consumption value and the minimum consumption value.

In the case of a symmetric distribution of the power consumption values around a mean value it is regarded as advantageous if only a single standby value is determined, whether by forming the difference between the rated consumption value and the maximum consumption value or by forming the difference between the rated consumption value and the minimum consumption value, since both difference-forming functions lead to the same standby values or rather the standby value formed using the maximum consumption value corresponds to the standby value formed using the minimum consumption value.

In order to enable the historical consumption values present in the preprocessing device to be updated, it is regarded as advantageous if the preprocessing device is embodied in such a way that it updates the historical consumption values during operation by replacing the oldest recorded historical consumption values in each case with currently recorded consumption values and after updating the consumption values in each case calculates a statistical distribution function which describes the statistical distribution of the updated historical consumption values.

As a general rule it is to be assumed that the consumption values of the power supply system are normally distributed; accordingly it is regarded as advantageous if the preprocessing device is embodied in such a way that it calculates the statistical distribution function on the assumption of a normal distribution of the consumption values.

The evaluation of the recorded historical consumption values can furthermore take into account other aspects, in particular the respective time of day at which the consumption values are recorded. For this reason it is regarded as advantageous if the preprocessing device is embodied in such a way that it evaluates the recorded historical consumption values according to predefined time-of-day intervals, in that it calculates the statistical distribution of the consumption values per time-of-day interval and determines which minimum consumption value and which maximum consumption value could occur for the predefined probability value in the current time-of-day interval, and on the basis of the minimum and maximum consumption value calculates the rated consumption value and the standby value relative to the time-of-day interval.

Furthermore, the consumption values can also vary over the weekdays, such that it is regarded as advantageous if the preprocessing device is embodied in such a way that it evaluates the recorded historical consumption values relative to the weekday and determines the rated consumption value and the standby value on a weekday-related basis.

The respective outside temperature can also be an influencing factor with regard to the power consumption of the power supply system, such that it is provided according to an advantageous development of the power supply system that the preprocessing device is embodied in such a way that it evaluates the recorded historical consumption values relative to the outside temperature.

The outside temperature can be taken into account particularly easily, and therefore advantageously, if the preprocessing device is embodied in such a way that it evaluates the recorded historical consumption values taking into consideration the current outside temperature, in that it checks in which temperature interval of a predefined group of temperature intervals the current outside temperature lies, calculates the statistical distribution solely of those consumption values which were measured at an outside temperature lying within the current temperature interval, and determines which minimum consumption value and which maximum consumption value could occur for the predefined probability value at the current outside temperature, and on the basis of the minimum and maximum consumption value calculates the rated consumption value and the standby value relative to the time-of-day interval.

In addition or alternatively it is also possible to take into account the type of the respective day, i.e. whether for example it is a working day, a Saturday, a Sunday or a public holiday. Accordingly it is regarded as advantageous if the preprocessing device is embodied in such a way that it evaluates the recorded historical consumption values taking the type of day into account.

With regard to taking the type of day into account it is regarded as advantageous if the preprocessing device is embodied in such a way that when evaluating the recorded historical consumption values it takes into account which type of day was present, and for the purpose of determining the statistical distribution of the consumption values it takes into consideration in each case only such values as were recorded on the respective type of day.

The preprocessing device can for example form part of the controller. In the case of such an embodiment it is regarded as advantageous if the controller comprises a data processing device and the preprocessing device is formed by means of a preprocessing control software module which can be executed by the data processing device.

Alternatively the preprocessing device and the controller can be separate components which are connected to each other via an interface.

In order to influence the power supply system it is regarded as advantageous if the controller is suitable for controlling the power generation of at least one power generating device of the power supply system and/or the power consumption of at least one power consuming device of the power supply system.

The invention furthermore relates to a preprocessing device for a power supply system as has been described hereinabove.

Such a preprocessing device is characterized according to the invention by a memory in which recorded historical consumption values are stored, and by a data processing device which is embodied in such a way that it calculates, on the basis of the recorded consumption values and on the basis of a probability value input on the user side which specifies the probability of an emergency-measure-free operation of the power supply system, a rated consumption value and a standby value by means of which the emergency-measure-free operation can be achieved with the predefined probability.

With regard to the advantages of the preprocessing device according to the invention let reference be made to the statements made above in connection with the power supply system according to the invention, since the advantages of the power supply system according to the invention essentially correspond to those of the preprocessing device according to the invention.

The invention furthermore relates to a method for controlling a power supply system comprising a plurality of power generating devices and a plurality of power consuming devices, wherein the control of the power supply system is realized on the basis of a rated consumption value specifying the anticipated power consumption of the power supply system and a standby value specifying a standby power, and wherein the standby value specifies the standby power that is to be provided by the power supply system so that emergency measures can be avoided if the actual power consumption deviates from the rated consumption.

With regard to such a method it is provided according to the invention that the rated consumption value and the standby value by means of which the emergency-measure-free operation of the power supply system can be achieved with the predefined probability are calculated on the basis of recorded historical consumption values and on the basis of a probability value predefined on the user side which specifies the probability of an emergency-measure-free operation of the power supply system.

With regard to the advantages of the method according to the invention let reference be made to the statements made above in connection with the power supply system according to the invention, since the advantages of the power supply system according to the invention essentially correspond to those of the method according to the invention.

BRIEF DESCRIPTION OF THE SEVERAL VIEWS OF THE DRAWING

The invention is explained in more detail below with reference to exemplary embodiments; in the figures, by way of example.

DESCRIPTION OF THE INVENTION

For clarity of illustration reasons the same reference signs are used consistently throughout the figures for identical or comparable components.

Figure 1:
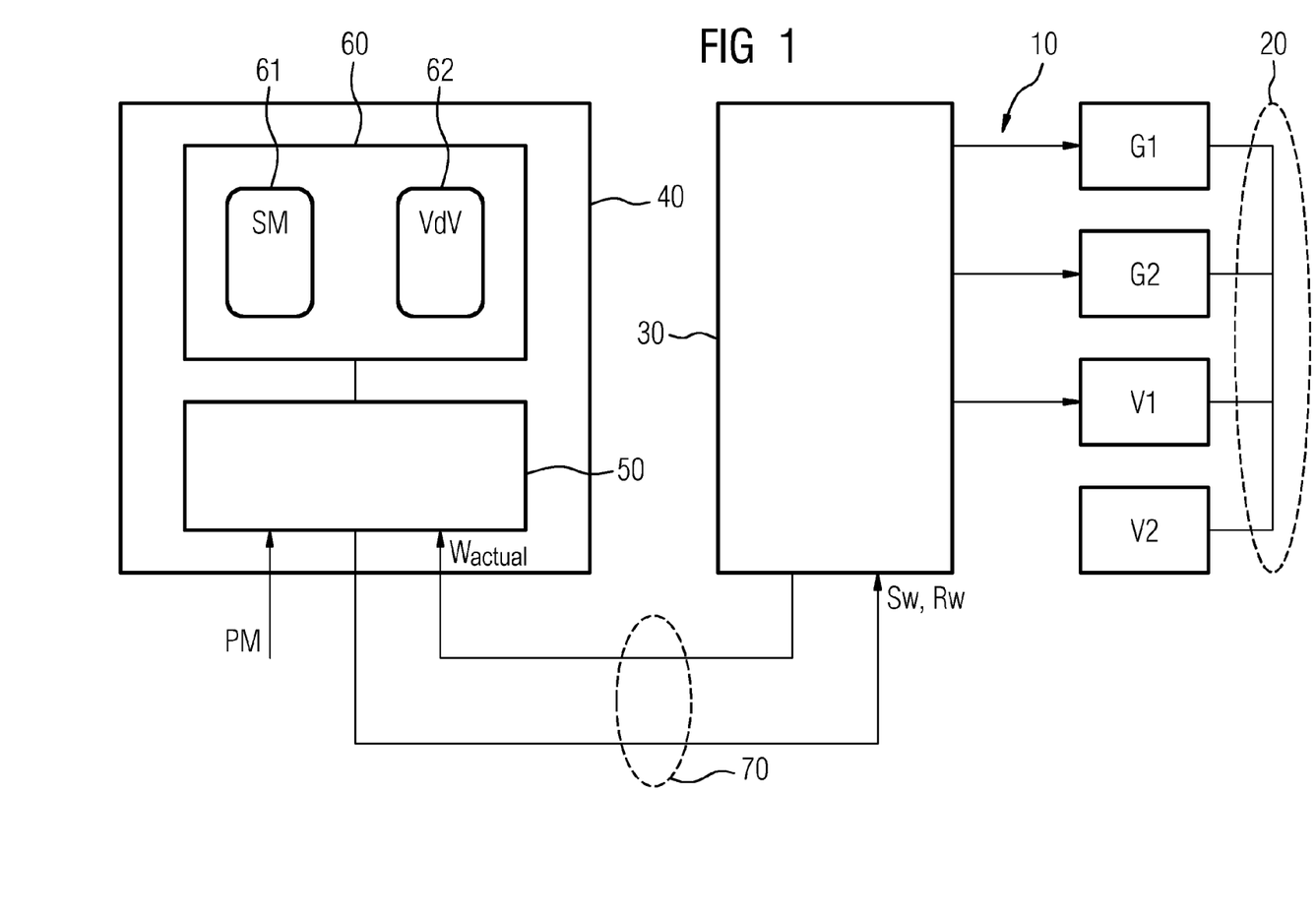
FIG. 1 shows a first exemplary embodiment of an inventive power supply system which is equipped with an exemplary embodiment of an inventive preprocessing device and with reference to which the inventive method is also explained by way of example.

FIG. 1 shows an exemplary embodiment of a power supply system 10 which comprises a plurality of power generating devices, of which, for clarity of illustration reasons, only two are represented, these being labeled with the reference signs G1 and G2, and a plurality of power consuming devices, of which, for clarity of illustration reasons, only two are represented in FIG. 1, these being labeled with the reference signs V1 and V2. The exchange of energy between the power generating devices G1 and G2 and the power consuming devices V1 and V2 takes place by way of a power distribution network 20 of the power supply system 10.

In order to ensure that the power consumption of the power consuming devices V1 and V2 corresponds at all times to the amount of energy generated by the power generating devices G1 and G2, a controller 30 is provided which is able to control the power generating devices G1 and G2. In the exemplary embodiment according to FIG. 1 it is furthermore provided that the controller 30 can also control at least one of the power consuming devices, for example the power consuming device V1, in order to influence its power consumption, i.e. to reduce or increase same.

In order to enable the power generating devices G1 and G2 as well as the power consuming device V1 to be controlled, the controller 30 is parameterized with a rated consumption value Sw and a standby value Rw. The rated consumption value Sw specifies the anticipated power consumption of the power consuming devices V1 and V2 present in the power supply system 10. The standby value Rw describes a standby power which the power supply system 10, i.e. in actuality the two power generating devices G1 and G2, is required to be able to provide if the actual power consumption deviates from the rated consumption in order to ensure that emergency measures, such as forced shutdowns, for example, are avoided.

In the exemplary embodiment according to FIG. 1, the standby value Rw and the rated consumption value Sw are not predefined on the user side, but determined or calculated automatically by a preprocessing device 40 and fed by the latter into the controller 30.

For this purpose the preprocessing device 40 comprises a data processing device 50 and a memory 60. The memory 60 has a first data storage area 61 in which a preprocessing control module SM is stored. The preprocessing control module SM contains software commands which can be executed by the data processing device 50 in order to ensure the function of the preprocessing device 40.

Historical consumption values, labeled with the reference sign VdV, are resident in a second data storage area 62 of the memory 60.

The preprocessing device 40 is connected to the controller 30 via an interface 70.

The power supply system 10 according to FIG. 1 can be operated for example as follows.

The data processing device 50 of the preprocessing device 40 executes the preprocessing control module SM, thereby causing the standby value Rw and the rated consumption value Sw to be calculated on the basis of a probability value PM predefined on the user side. The probability value PM specifies the probability with which an emergency-measure-free operation of the power supply system is to be achieved. In order to facilitate such a calculation, the data processing device 50 reads out the second storage area 62 and hence the historical consumption values VdV.

Figure 2:
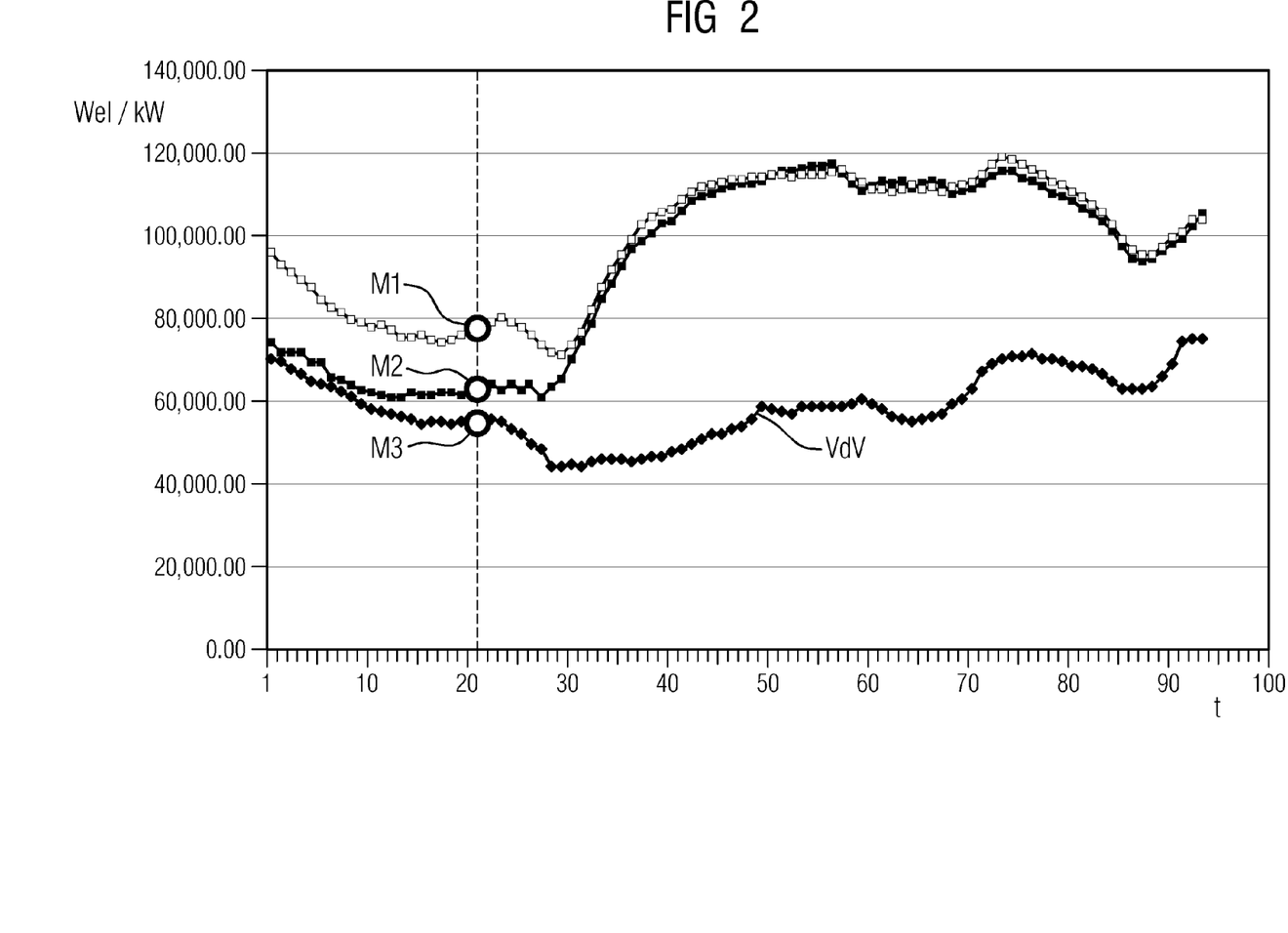
FIG. 2 shows by way of example historical consumption values which are evaluated by the preprocessing device according to FIG. 1, wherein the consumption values are plotted over the time of day for different days.

FIG. 2 shows by way of example how the historical consumption values VdV may appear. The progression of the power consumption Wel over time t for three different weekdays is depicted in FIG. 2. A mean value over 15 minutes is shown in each case; for this reason 96 measured values are plotted in the figure over the respective time-of-day interval number. The time-of-day interval "21" for example relates to the time period between 5:00 and 5:15 in the morning. The measured values of the three measurement curves for this time-of-day interval "21" are labeled with the reference signs M1, M2, M3 in FIG. 2. It can be seen that the three measured values M1, M2 and M3 lie in a range between approx. 55,000 kW and approx. 78,000 kW.

Figure 3:
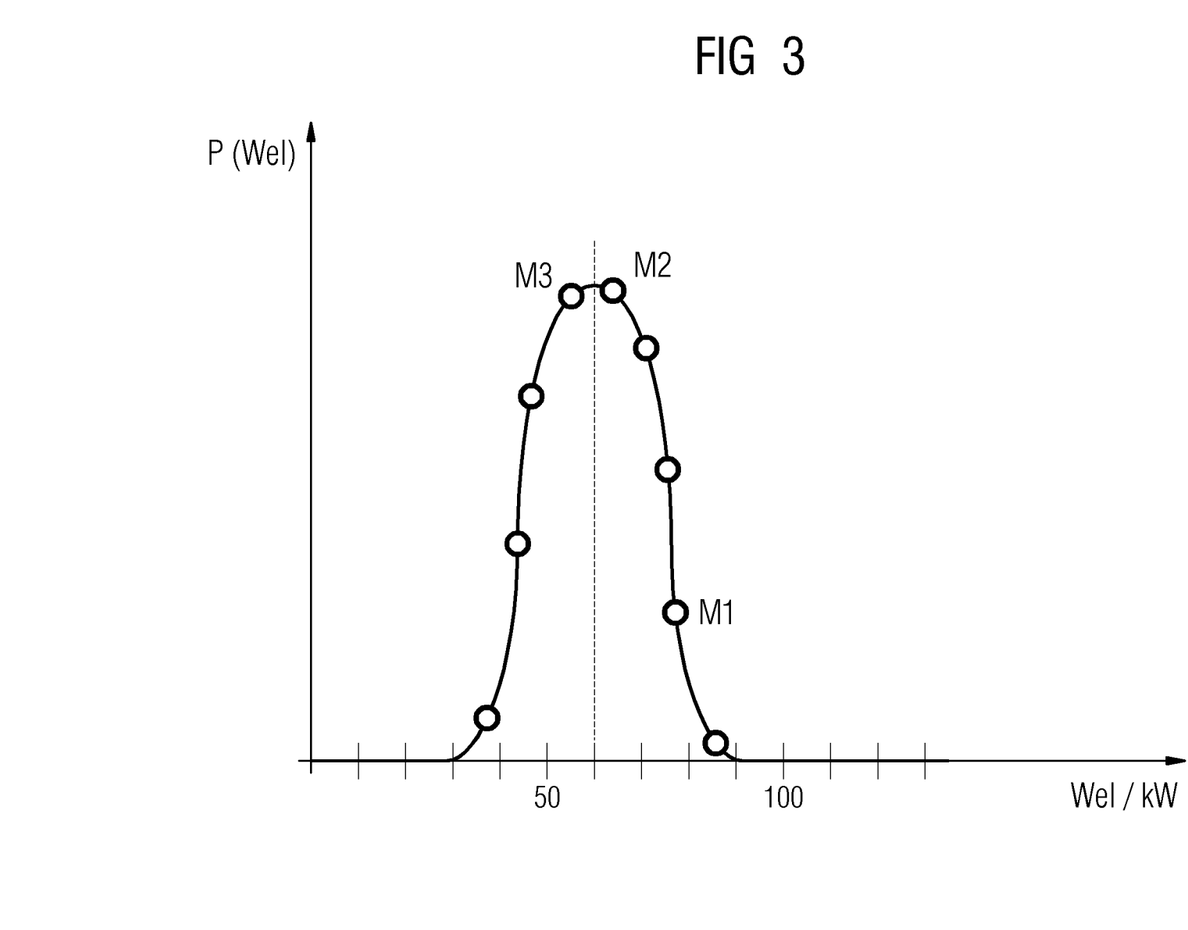
FIG. 3 shows the density distribution of the consumption values for a selected time instant or for a selected time interval on different days.

FIG. 3 shows by way of example the distribution of the consumption values from FIG. 2 in a different representation, namely in the form of a density function P(Wel) versus the power consumption Wel. The three measured values M1, M2 and M3 which are also labeled accordingly in FIG. 2 are shown.

Also to be seen in FIG. 3 are further measured values resulting from corresponding time-of-day measurements, as illustrated in FIG. 2. It can be seen that the density function P(Wel) of the recorded measured values has approximately the shape of a Gaussian curve, from which it can be inferred that the distribution of the measured values is normally distributed or corresponds to a standard distribution.

The data processing device 50 according to FIG. 1 can for example evaluate the density function P(Wel) according to FIG. 3 by determining the distribution function F(Wel) of the power consumption values Wel by integration, and moreover according to:

$$F(Wel) = \int_0^{Wel} P(W)\,dW$$

Figure 4:
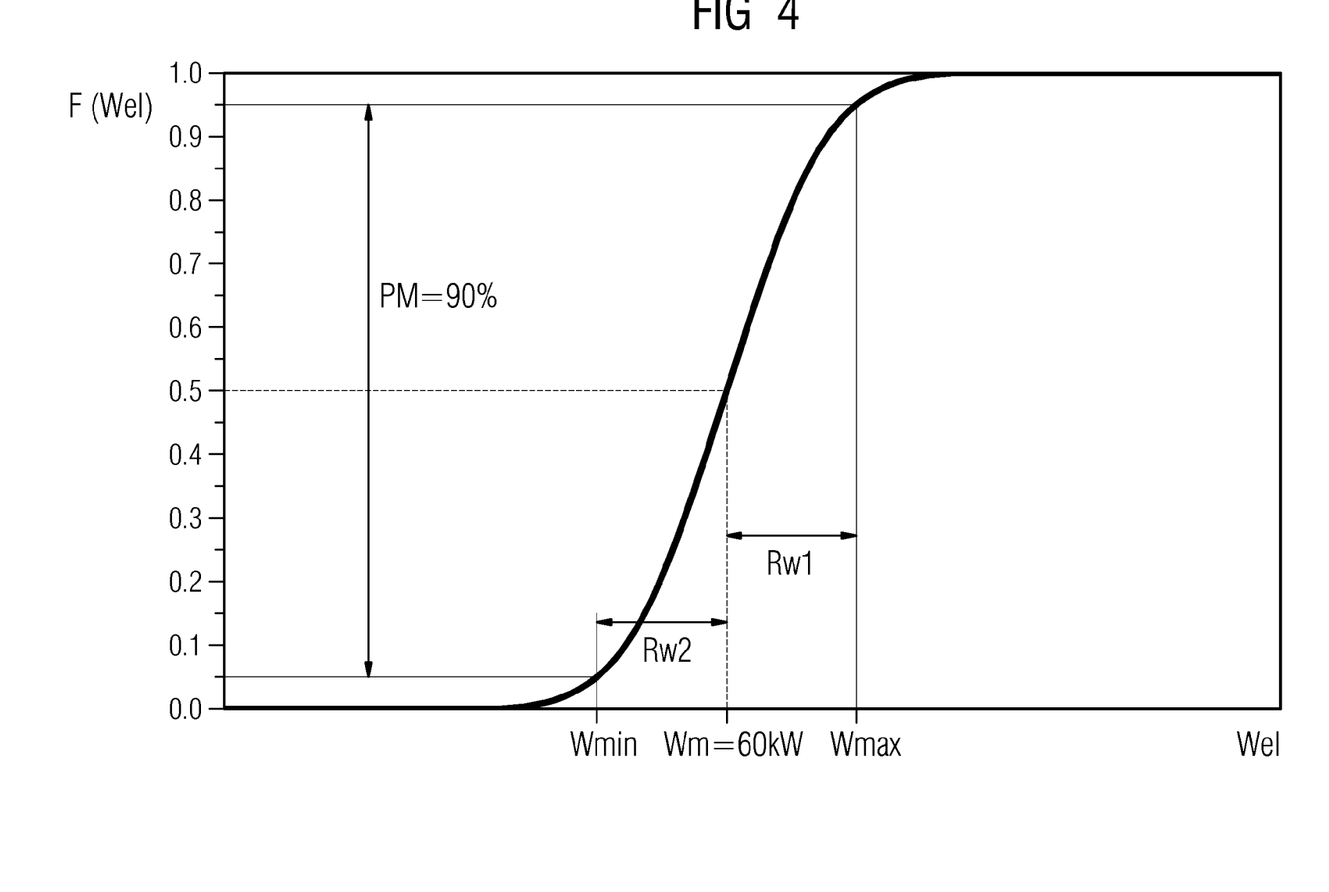
FIG. 4 shows the statistical distribution function of the consumption values resulting from the density distribution of the consumption values as well as by way of example the calculation of rated consumption value and standby value on the basis of the statistical distribution function.

The distribution function F(Wel) is shown by way of example in FIG. 4. The probability with which certain power consumption values Wel are exceeded or undershot can be seen. It is possible to read off in FIG. 4 for example that the power consumption will exceed a minimum consumption value Wmin with a probability of 95% and will fall below a maximum consumption value Wmax with a probability of 95%. In other words, the power consumption will therefore lie within the consumption interval between Wmin and Wmax with a probability value of PM=90%.

The respective values for Wmin and Wmax can be read off in an analogous manner for other probability values PM.

By evaluating the distribution function F(Wel) it is possible to determine one or two standby values Rw or Rw1 and Rw2 as well as a rated consumption value Sw in a simple manner. Essentially different variants are available in this case:

Variant I:

Starting from the minimum consumption value Wmin and the maximum consumption value Wmax in FIG. 4, the rated consumption value Sw can be calculated by averaging, namely according to:

$$Sw=Wmin+(Wmax-Wmin)/2=Wmin/2+Wmax/2.$$

The standby value Rw for the controller 30 according to FIG. 1 can in this case be calculated according to:

$$Rw=(Wmax-Wmin)/2.$$

Variant II:

Alternatively, the rated consumption value Sw for the controller 30 according to FIG. 1 can be determined from the curve according to FIG. 3 by reading off the maximum value of the density function P(Wel). As can be seen in FIG. 3, the maximum value of the density function P(Wel), and hence the average consumption, lies at approx. 60 kW, from which a corresponding rated consumption value Sw=60 kW is yielded.

By referring to the rated consumption value Sw it is then possible with the aid of FIG. 4 to determine a first standby value Rw1 by forming the difference between the rated consumption value Sw and the maximum consumption value Wmax, and a second standby value Rw2 by forming the difference between the rated consumption value Sw and the minimum consumption value Wmin.

In the case of a normal distribution of the power consumption values or a Gaussian curve as shown in FIG. 3, the two variants I and II are identical with regard to the result, both methods yielding a rated consumption value Sw of 60 kW and two equal-sized standby values Rw1 and Rw2, so that only a single one of the two values, i.e. the value Rw1 or the value Rw2, needs to be fed in as standby value Rw into the controller 30 according to FIG. 1.

In the case of a distribution other than a normal distribution of the consumption values it may transpire that the first standby value Rw1 deviates from the second standby value Rw2; in this case it is of advantage if both standby values Rw1 and Rw2 are transmitted to the controller 30 according to FIG. 1. This is explained in greater detail further below.

The data processing device 50 according to FIG. 1 will therefore determine at regular intervals or continuously in the described manner a standby value Rw as well as a rated consumption value Sw and transmit said values to the controller 30 so that the latter can control the power generating devices G1 and G2 as well as the power consuming device V1 in such a way that the actual power consumption always lies in the range of the rated consumption value Sw and does not leave the reserve standby range defined by the specified standby value Rw.

In order to ensure that the historical consumption values VdV stored in the second data storage area 62 of the memory 60 can be updated, it is provided in the exemplary embodiment according to FIG. 1 that the controller 30 transmits the current consumption values Wactual to the data processing device 50. The data processing device 50 can store the received power consumption values in the second data storage area 62 and at the same time delete the oldest consumption values in each case. In this way an updating of the historical consumption values is achieved to the extent that the historical consumption values resident in the second data storage area 62 always relate to the most recent reference section with respect to time in each case.

Figure 5:
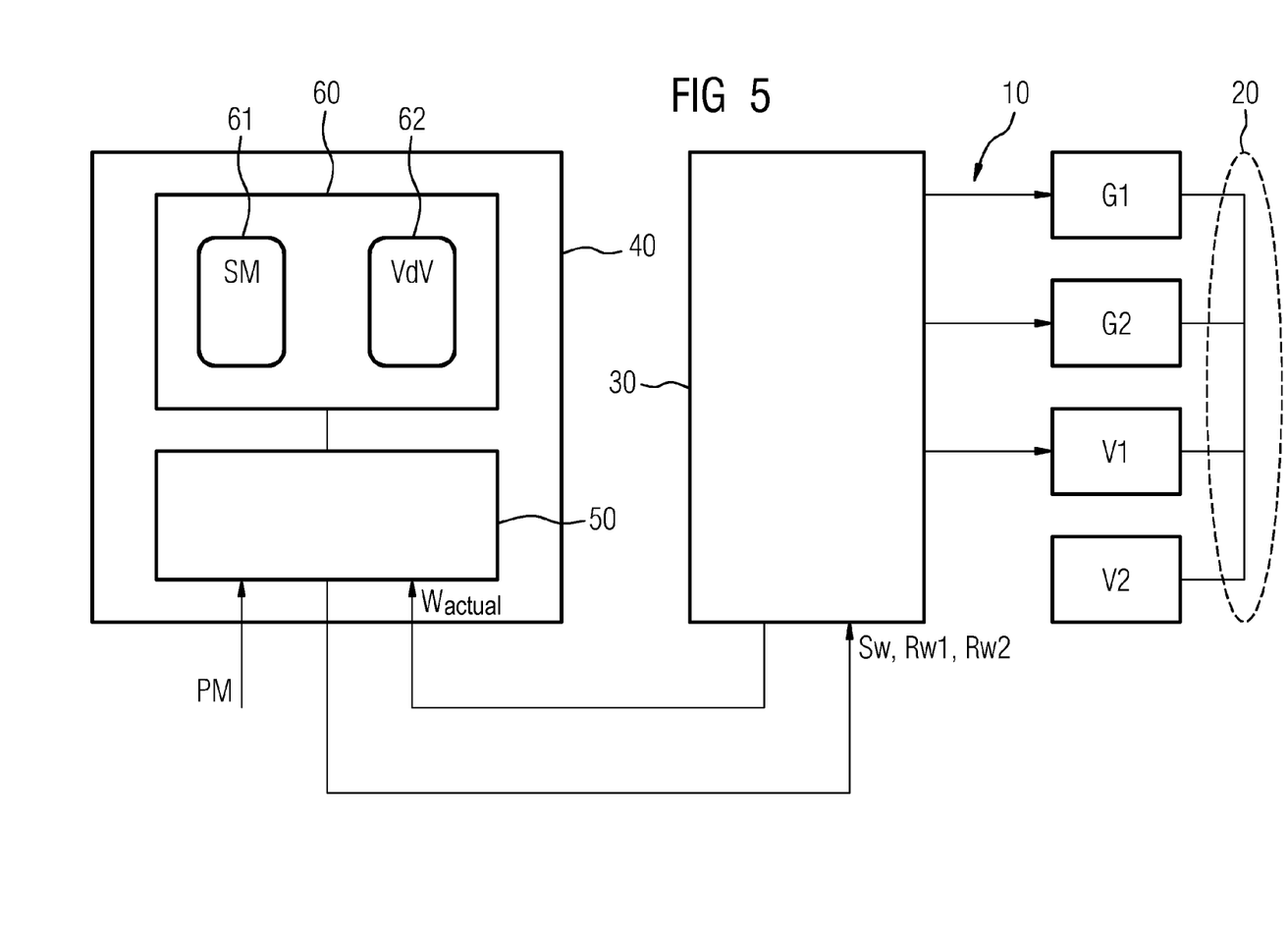
FIG. 5 shows a second exemplary embodiment of a power supply system in which two standby values are formed instead of a single standby value.

FIG. 5 shows a second exemplary embodiment of a power supply system 10 which is essentially similar in structure to the power supply system 10 according to FIG. 1, so only the differences will be enlarged upon hereinbelow.

The preprocessing device 40 is configured in such a way that it allows suitable control of the power supply system 10 by means of the controller 30 also for consumption values which are not normally distributed or for consumption values not conforming to a standard distribution. For this purpose the data processing device 50 generates not just one standby value Rw, but two standby values Rw1 and Rw2, as has already been referred to hereinabove in connection with FIG. 4 (see Variant II). The first standby value Rw1 is determined for example by forming the difference between the rated consumption value Sw determined from FIG. 3 and the maximum consumption value Wmax (cf. FIG. 4), and the second standby value Rw2 by forming the difference between the rated consumption value Sw and the minimum consumption value Wmin (cf. FIG. 4). The two standby values Rw1 and Rw2 are transmitted to the controller 30, thus enabling the latter to draw upon a different standby value in the event that the rated consumption value Sw is undershot than in the event that the rated consumption value Sw is exceeded, by taking into account the respectively provided standby value Rw1 or Rw2.

Figure 6:
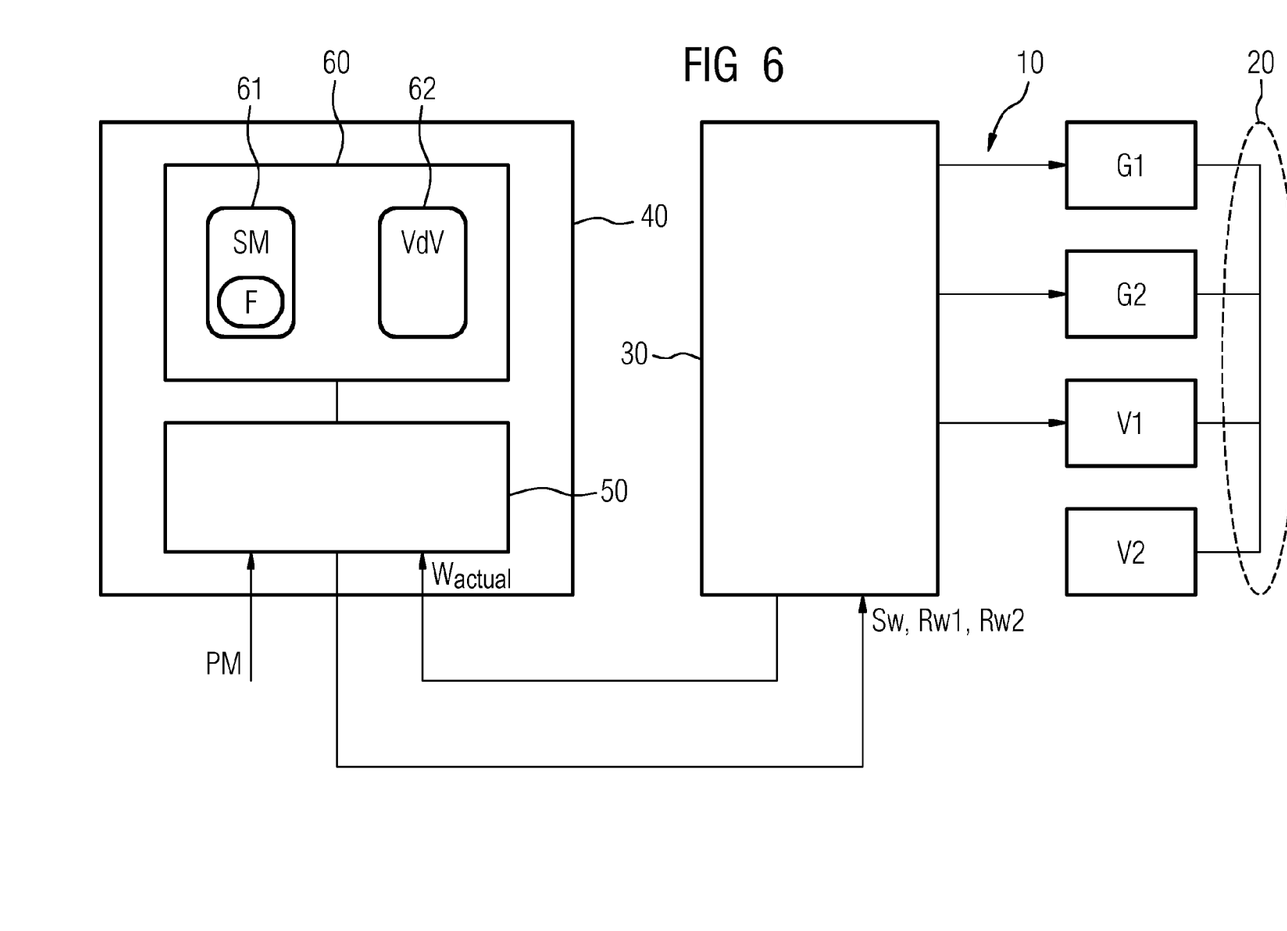
FIG. 6 shows a third exemplary embodiment of an inventive power supply system which is provided with a filter enabling a weekday-specific, outside-temperature-specific and/or type-of-day-specific evaluation of the historical consumption values.

FIG. 6 shows a third exemplary embodiment of a power supply system 10 according to the invention. In this exemplary embodiment the data processing device 50 of the preprocessing device 40 additionally executes a filter function. For this purpose a filter-forming filter module F is integrated in the preprocessing control module SM or, as the case may be, in the first data storage area 61 of the memory 60. This filter module enables the data processing device 50 to provide the incoming consumption values Wactual of the controller 30 with identifiers prior to or at the time of being stored in the second data storage area 62, which identifiers identify the weekday (in other words, e.g. Monday, Tuesday, Wednesday, . . . , Sunday), the type of day (in other words, e.g. workday, Saturday, Sunday or public holiday) and/or the outside temperature at the time of recording the consumption value. With the aid of these identifiers it is possible during a subsequent evaluation of the historical consumption values VdV to take into account only such consumption values VdV as were recorded on corresponding weekdays, at corresponding outside temperatures and/or on corresponding types of day and to ignore all other consumption values. Determining the rated consumption value Sw as well as the standby value or standby values Rw is significantly improved by such an individualized evaluation of the historical consumption values VdV by way of identifiers. In other respects the detailed explanations in connection with FIG. 1 apply analogously to the exemplary embodiment according to FIG. 6.

Figure 7:
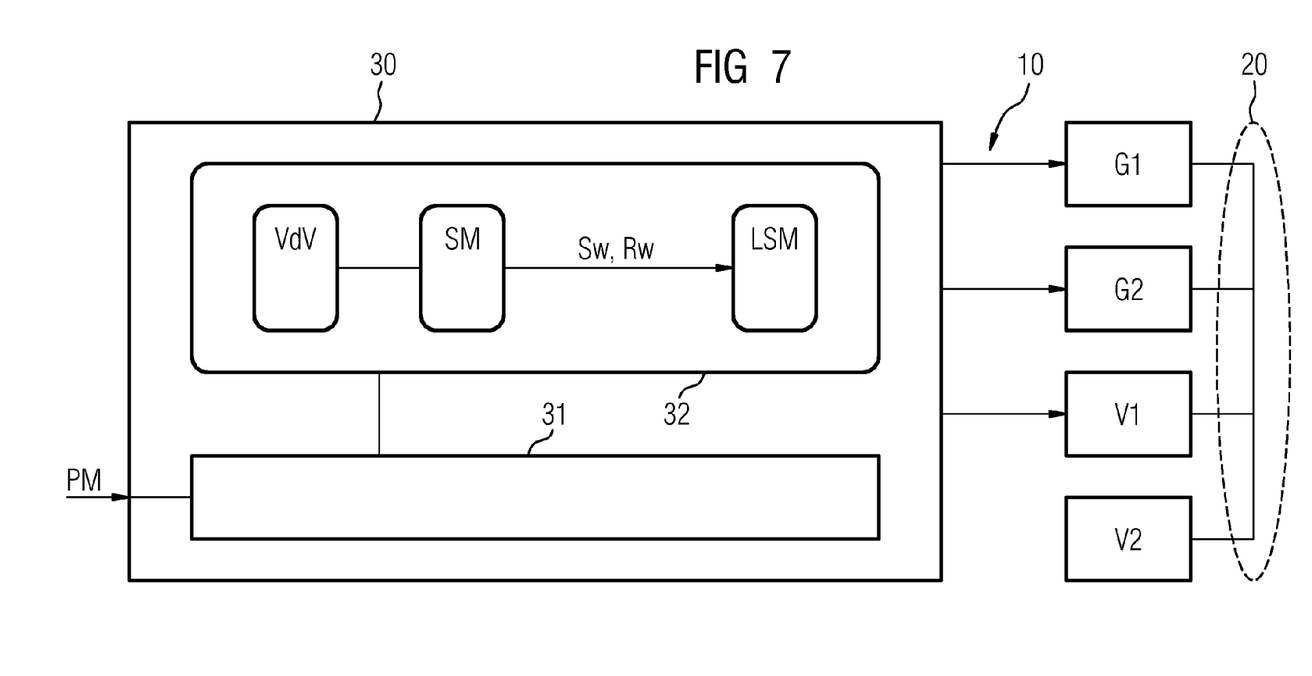
FIG. 7 shows a fourth exemplary embodiment of a power supply system in which a preprocessing device is integrated in a controller of the power supply system.

FIG. 7 shows an exemplary embodiment of a power supply system 10 in which the preprocessing device is not a separate component connected to the controller 30 via an interface 70 (cf. FIG. 1), but instead is integrated in the controller 30.

In order to enable such an integration of the preprocessing device 40 into the controller 30, the controller 30 has, in addition to a data processing device 31, a memory 32 which can accommodate both a control module LSM and the memory contents SM and VdV of the memory 60 according to FIG. 1.

The control module LSM contains control commands which, when executed by the data processing device 31, enable the mode of operation of the controller 30, as has already been explained in connection with FIGS. 1 to 6.

In the exemplary embodiment according to FIG. 7, the data processing device 31 also executes the preprocessing control module SM for the preprocessing device 40 in addition to the control module LSM, which means that the functionality of the preprocessing device 40 according to FIGS. 1-6 is realized by the data processing device 31 of the controller 30. In the course of processing the preprocessing control module SM, the data processing device 31 will have recourse to the historical consumption values VdV and take into account the probability value PM input on the user side, as has already been explained in detail in connection with FIGS. 1 to 6. The values formed by the preprocessing control module SM, namely the standby value Rw and the rated consumption value Sw, reach the control module LSM, which undertakes a further processing of said values, as has already been explained hereinabove in connection with FIGS. 1 to 6. The statements made above therefore apply analogously in this regard.

Figure 8:
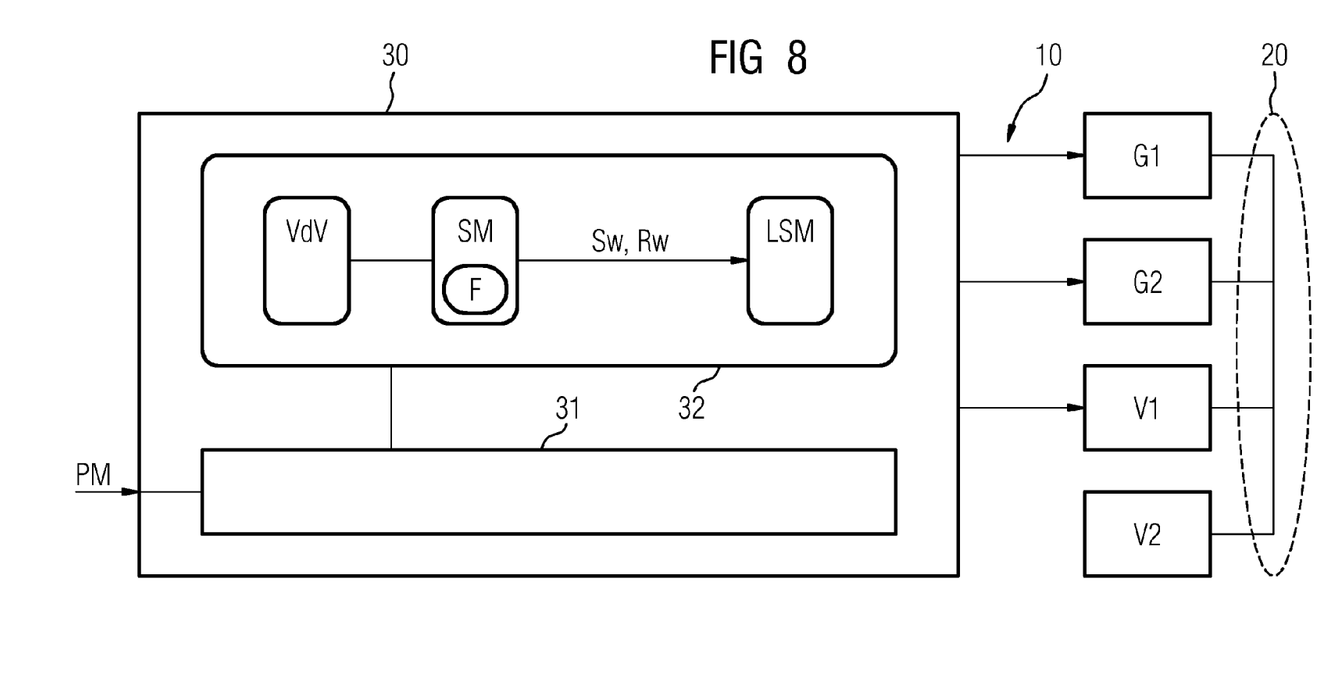
FIG. 8 shows a fifth exemplary embodiment of a power supply system in which a preprocessing device with filter is integrated in a controller of the power supply system.

FIG. 8 shows an exemplary embodiment of a power supply system 10 in which the preprocessing device 40 according to FIG. 1 is likewise implemented in the controller 30. The preprocessing control module SM contains a filter module F, as has already been explained in more detail in connection with FIG. 6. In other respects the statements made above apply analogously.

Figure 9:
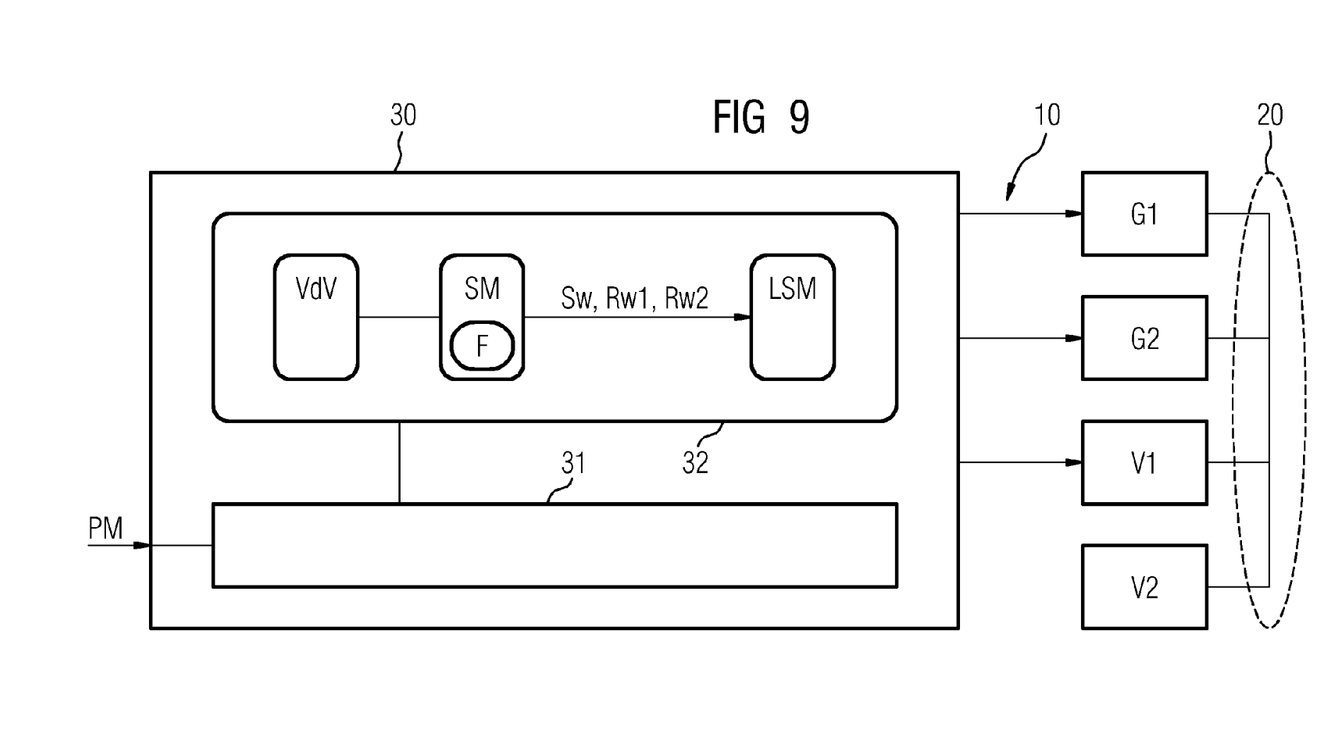
FIG. 9 shows a sixth exemplary embodiment of a power supply system in which a preprocessing device is integrated in the controller and two standby values are formed.

FIG. 9 shows a further exemplary embodiment of a power supply system 10 in which the preprocessing device 40 according to FIG. 1 is integrated in the controller 30. In this exemplary embodiment the preprocessing control module SM generates two standby values Rw1 and Rw2, as has already been explained in depth hereinabove in connection with FIG. 5. The statements made above therefore apply analogously in this regard.

Although the invention has been illustrated and described in greater detail on the basis of preferred exemplary embodiments, the invention is not limited by the disclosed examples and other variations may be derived herefrom by the person skilled in the art without leaving the scope of protection of the invention.

LIST OF REFERENCE SIGNS

10 Power supply system
20 Power distribution network
30 Controller
31 Data processing device
32 Memory
40 Preprocessing device
50 Data processing device
60 Memory
61 First data storage area
62 Second data storage area
70 Interface
F Filter module
F(Wel) Distribution function
G1 Power generating device
G2 Power generating device
LSM Control module
M1 Measured value
M2 Measured value M3 Measured value
PM Probability value
P(Wel) Density function
Rw Standby value
Rw1 Standby value
Rw2 Standby value
SM Preprocessing control module
Sw Rated consumption value
Wel Power consumption
Wactual Current consumption value
Wmax Maximum consumption value
Wmin Minimum consumption value
VdV Historical consumption values
V1 Power consuming device
V2 Power consuming device

The invention claimed is:

1. A power supply system, comprising:
a plurality of power generating devices;
a plurality of power consuming devices;
a controller for controlling the power supply system, said controller controlling the power supply system on a basis of a rated consumption value specifying an anticipated power consumption of the power supply system and at least one standby value specifying a standby power, the at least one standby value specifying the standby power that is to be provided by the power supply system by which emergency measures can be avoided if an actual power consumption deviates from the rated consumption; and
a preprocessing device for calculating, on a basis of recorded historical consumption values and on a basis of a predefined probability value predefined on a user side specifying a probability of an emergency-measure-free operation of the power supply system, the rated consumption value and the at least one standby value by which the emergency-measure-free operation can be achieved with a predefined probability.

2. The power supply system according to claim 1, wherein said preprocessing device is embodied such that said preprocessing device uses the recorded historical consumption values to calculate a statistical distribution of the recorded historical consumption values and on a basis of the statistical distribution determines which minimum consumption value and which maximum consumption value could occur for the predefined probability value, and on a basis of the minimum and maximum consumption values determines the at least one standby value.

3. The power supply system according to claim 2, wherein said preprocessing device is embodied such that said preprocessing device calculates: the rated consumption value by forming an average from the recorded historical consumption values, a first standby value by forming a difference between the rated consumption value and the maximum consumption value, and a second standby value by forming a difference between the rated consumption value and the minimum consumption value.

4. The power supply system according to claim 1, wherein said preprocessing device is embodied such said preprocessing device updates the recorded historical consumption values during operation by replacing oldest recorded historical consumption values in each case with currently recorded consumption values, and after updating the recorded historical consumption values said preprocessing device calculates a statistical distribution function which describes the statistical distribution of updated historical consumption values.

5. The power supply system according to claim 4, wherein said preprocessing device is embodied such that said preprocessing device calculates the statistical distribution function on an assumption of a normal distribution of the updated historical consumption values.

6. The power supply system according to claim 1, wherein said preprocessing device is embodied such that said preprocessing device evaluates the recorded historical consumption values according to predefined time-of-day intervals, said preprocessing device calculates a statistical distribution of consumption values per time-of-day interval and determines which minimum consumption value and which maximum consumption value could occur for the predefined probability value in a current time-of-day interval, and on a basis of the minimum and maximum consumption value calculates the rated consumption value and the standby value relative to a time-of-day interval.

7. The power supply system according to claim 1, wherein said preprocessing device is embodied such that said preprocessing device evaluates the recorded historical consumption values relative to a weekday and determines the rated consumption value and the standby value on a weekday-related basis.

8. The power supply system according to claim 1, wherein said
preprocessing device is embodied such that said preprocessing device evaluates the recorded historical consumption values relative to an outside temperature.

9. The power supply system according to claim 1, wherein said preprocessing device is embodied such that said preprocessing device evaluates the recorded historical consumption values taking into account a current outside temperature, wherein said preprocessing device checks in which temperature interval of a predefined group of temperature intervals the current outside temperature lies, calculates a statistical distribution solely of the consumption values that were measured at an outside temperature lying within a current temperature interval, and determines which minimum consumption value and which maximum consumption value could occur for the predefined probability value at the current outside temperature, and on the basis of the minimum and maximum consumption value calculates the rated consumption value and the standby value relative to a time-of-day interval.

10. The power supply system according to claim 1, wherein said preprocessing device is embodied such that said preprocessing device evaluates the recorded historical consumption values taking into account a respective type of day.

11. The power supply system according to claim 10, wherein said preprocessing device is embodied such that when evaluating the recorded historical consumption values said preprocessing device takes into account which type of day was present, and for a purpose of determining the statistical distribution of the consumption values said preprocessing device takes into consideration in each case only such values as were recorded on a respective type of day.

12. The power supply system according to claim 1, wherein said preprocessing device forms part of said controller.

13. The power supply system according to claim 12, wherein said controller contains a data processing device, and said preprocessing device is formed by a preprocessing control software module which can be executed by said data processing device.

14. A preprocessing device for a power supply system having a plurality of power generating devices, a plurality of power consuming devices, and a controller for controlling the power supply system, the controller controlling the power supply system on a basis of a rated consumption value specifying an anticipated power consumption of the power supply system and at least one standby value specifying a standby power, the at least one standby value specifying the standby power that is to be provided by the power supply system by which emergency measures can be avoided if an actual power consumption deviates from the rated consumption, the preprocessing device comprising:

a memory for storing recorded historical consumption values; and a data processing device for calculating, on a basis of the recorded historical consumption values and on a basis of a predefined probability value input on a user side specifying a probability of an emergency-measure-free operation of the power supply system, the rated consumption value and the standby value by which the emergency-measure-free operation can be achieved with the predefined probability.

15. A method for controlling a power supply system containing a plurality of power generating devices and a plurality of power consuming devices, which comprises the steps of:

realizing, via a controller, control of the power supply system on a basis of a rated consumption value specifying an anticipated power consumption of the power supply system and a standby value specifying a standby power, the standby value specifying the standby power to be provided by the power supply system by which emergency measures can be avoided if an actual power consumption deviates from the rated consumption value; and calculating, via the controller, the rated consumption value and the standby value by means of which an emergency-measure-free operation can be achieved with a predefined probability on a basis of the recorded historical consumption values and on a basis of a probability value predefined on a user side specifying a probability of the emergency-measure-free operation of the power supply system.

* * * * *